United States Patent [19]

Fox et al.

[11] Patent Number: 4,469,185
[45] Date of Patent: Sep. 4, 1984

[54] CUTTER WHEEL FOR TILLAGE APPARATUS

[75] Inventors: Robert E. Fox, Minburn; Wendell D. Reece, Ankeny, both of Iowa

[73] Assignee: Deere & Company, Moline, Ill.

[21] Appl. No.: 256,643

[22] Filed: Apr. 23, 1981

Related U.S. Application Data

[63] Continuation of Ser. No. 970,538, Dec. 18, 1978, abandoned.

[51] Int. Cl.³ .......................................... A01B 33/10
[52] U.S. Cl. .................................. 172/540; 172/120; 37/94; 299/91; 175/410
[58] Field of Search ................ 172/120, 123, 55, 548, 172/556, 747, 540, 555, 60; 37/189, 94, 190, 191–197; 299/91, 93, 89; 125/15, 22; 76/112; 83/839; 29/105; 144/240, 2 N; 175/410, 411

[56] References Cited

U.S. PATENT DOCUMENTS

| | | | |
|---|---|---|---|
| 1,644,596 | 10/1927 | Krieger | 172/540 |
| 2,559,996 | 7/1951 | Pettman | 172/556 |
| 3,268,259 | 8/1966 | Snipe | 299/91 |
| 3,319,365 | 5/1967 | Perry | 172/15 |
| 3,419,976 | 1/1969 | Reising | 172/123 |
| 3,519,309 | 7/1970 | Engle | 299/91 |
| 3,570,566 | 3/1971 | McCreery | 144/2 N |
| 3,663,063 | 5/1972 | Johnmeyer | 37/94 |
| 3,737,199 | 6/1973 | Stephenson | 299/89 |
| 3,995,699 | 12/1976 | Blucher | 172/255 |
| 4,043,281 | 8/1977 | Sorlie | 172/538 |
| 4,043,404 | 8/1977 | Sorlie | 172/555 |
| 4,051,792 | 10/1977 | Brandt | 172/120 |
| 4,059,161 | 11/1977 | Smith | 172/120 |
| 4,094,362 | 6/1978 | Hild | 172/120 |
| 4,261,832 | 8/1980 | Stephenson | 172/540 |

FOREIGN PATENT DOCUMENTS

| | | | |
|---|---|---|---|
| 149720 | 6/1951 | Australia . | |
| 242945 | 11/1962 | Australia . | |
| 2728656 | 1/1978 | Fed. Rep. of Germany | 172/555 |

*Primary Examiner*—Richard J. Johnson

[57] ABSTRACT

An improved cutter wheel that is particularly useful with tilling apparatus for sod seeding purposes. The cutter wheel is mounted for rotation by a drive structure that includes a drive shaft. The cutter wheel includes a central disk portion with an outer periphery defining a plurality of equally spaced slots, each for receiving a tip-holding insert. A bullet-shaped tungsten carbide tip is soldered or brazed to the tip-holder and the holder is welded to the disk. The disk periphery is shaped to allow cutting clearance for the tip, to protect the tip from breaking off, and to provide rear support for the tip-holder. The angle at which the tip is connected to the holder is chosen so that the brazed or soldered joint is loaded primarily in compression as the wheel cuts through the soil.

9 Claims, 5 Drawing Figures

CUTTER WHEEL FOR TILLAGE APPARATUS

CROSS REFERENCE TO RELATED APPLICATION

This is a continuation of U.S. application Ser. No. 970,538, filed Dec. 18, 1978 now abandoned.

FIELD OF THE INVENTION

The present invention relates generally to a tillage apparatus, and more specifically to a tillage apparatus having an improved cutter wheel.

BACKGROUND OF THE INVENTION

Conventional tillage implements such as the disk harrow, disk cultivator and rotating hoe are not completely suitable for preparing ground for seeding where legumes are to be grown in established grass sod.

In order to provide a tillage apparatus better suited for preparing ground for seeding or grassland renovation where sod is present, towed implements having a series of cutting wheels driven to open a furrow have been developed. Devices of this type are shown, for example, in U.S. Pat. Nos. 4,023,510; 4,043,281; 4,043,404; and 4,051,792. . This type of tillage implement is particularly useful where legumes are to be grown in established grass sod, especially since the ground surface is often uneven or rocky and may have grass swards of differing thicknesses thereon. The implement is also useful for interseeding grasses such as rye and wheat into Bermuda grass.

Cutting of the sward and sod mat and provision of a furrow therein has been a continuing problem. Although cutter wheels for the tillage implements have been known and suggested, such wheels have not been completely satisfactory. Wearing of the cutter wheels is a common problem because the wheels are driven in the soil. Additionally the rough, rocky terrain often encountered adds to the problem of wear and breakage.

SUMMARY OF THE INVENTION

This invention provides an improved cutter wheel for use with a tillage implement.

As a part of the improved structure, a cutter wheel is formed from a disk which receives a plurality of inserts, each having a hard bullet-shaped tip secured thereon and defining a cutting tooth. In addition, in the preferred embodiment, each insert is backed by a portion of the disk, and the tip is attached to the insert so that it is loaded primarily in compression. The disk is shaped to protect the tip from breaking off when obstacles are encountered.

It is, therefore, an object of the present invention to provide an improved cutter wheel.

It is a further object of this invention to provide an improved cutter wheel for a tillage apparatus for sod seeding purposes.

It is another object of this invention to provide an improved cutter wheel which has an increased lifetime.

It is still another object of the present invention to provide an improved cutter wheel for receiving a plurality of hardened tips thereon, each tip defining a cutting tooth.

It is a further object of the invention to provide a cutter wheel having a tungsten carbide tip secured thereon so that the area of the connection is loaded primarily in compression to prevent breaking off of the tip.

These and other objects, features and advantages of the present invention will become obvious from the description which follows taken in conjunction with the accompanying drawings, in which.

DESCRIPTION OF THE PREFERRED EMBODIMENT

Figure 1:
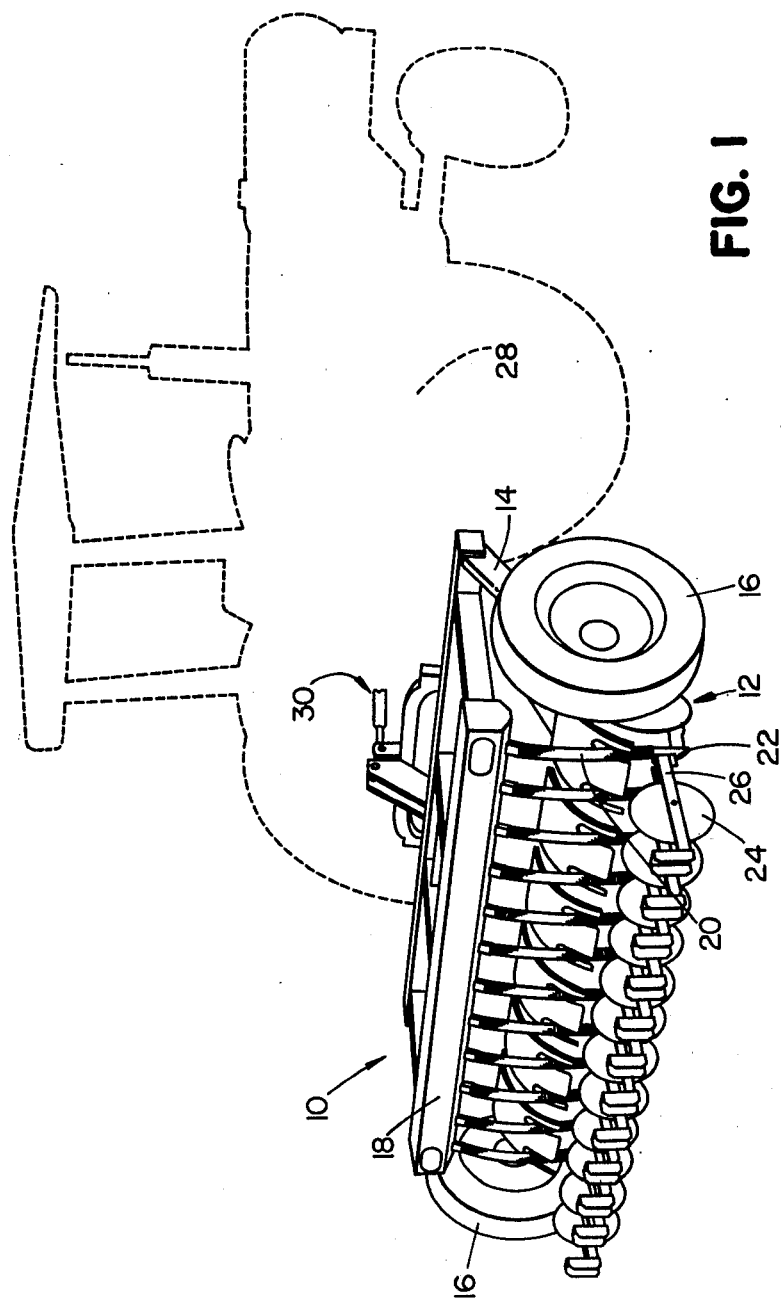
FIG. 1 is a perspective view of the tillage apparatus having the improved cutter wheel mounted thereon.

As shown in FIG. 1, a tillage apparatus 10 carries the improved cutter wheel 12 of the present invention. The tillage apparatus 10 includes a frame member 14 which has gauge wheels 16 mounted thereon. Also mounted on the frame 14 is a seed box 18. Seed tubes 20 lead from seed gates below the box 18 to seed boot assemblies 22. Trailing each seed boot assembly 22 is a packer wheel member 24 carried by arms 26. The apparatus 10 is connected to a tractor 28 or similar vehicle by a conventional threepoint hitch 30.

Figure 3:
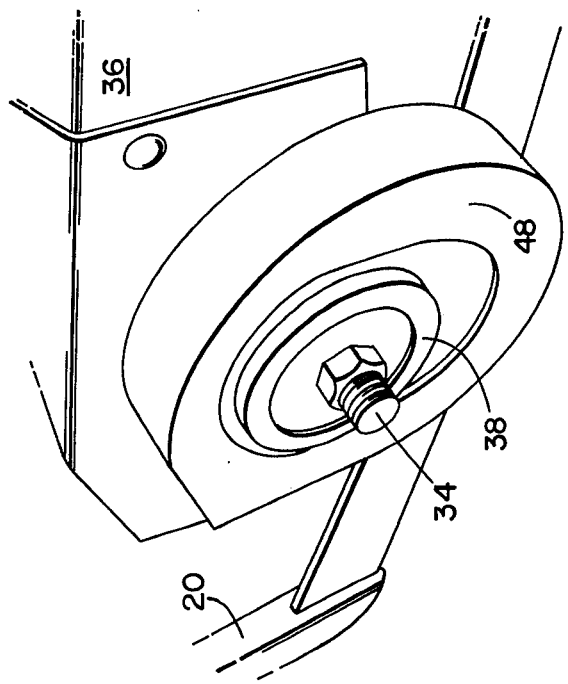
FIG. 3 is a perspective view of the drive structure for a cutter wheel showing the friction drive and threaded driveshaft upon which the cutter wheel is mounted.
Figure 2:
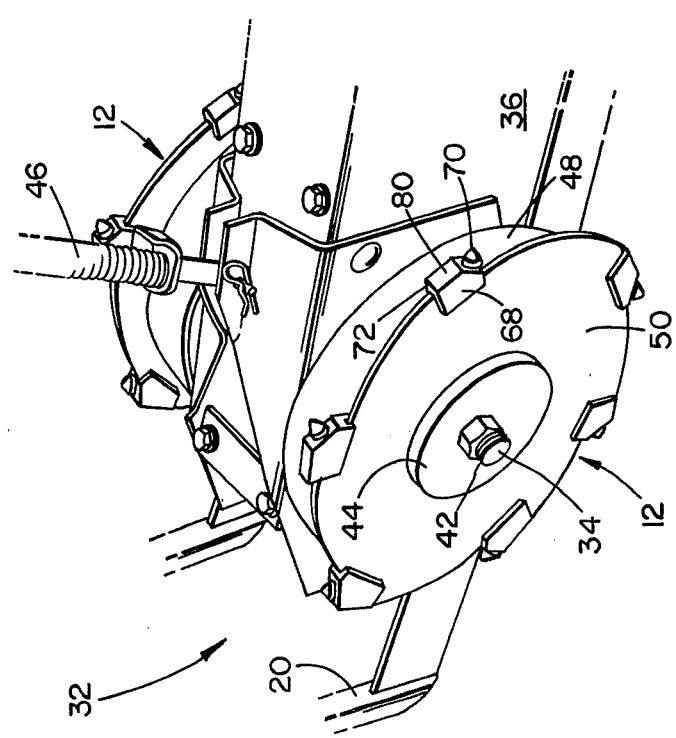
FIG. 2 is a perspective view of a portion of the tillage apparatus shown in FIG. 1 to illustrate the cutter wheel on a mounting unit.

As shown in FIG. 2, the cutter wheels 12 are mounted in a double-row configuration shown generally at 32. A drive shaft 34 is supported by a casing 36 pivotally connected to a transverse pivot rod (not shown) near the front of the frame member 14. The drive shaft 34 is rotated by a drive chain and sprocket located within casing 36. The chain and sprocket are powered in a conventional manner through shafts and a gear box from the tractor power take-off. A friction hub 38 (FIG. 3) is preferably mounted on shaft 34 for rotation therewith. A nut 40 threaded on threaded end 42 secures the cutter wheel 12 between a disk 44 and the friction hub 38 for rotation with the shaft 34.

Each double-row assembly 32 is biased downwardly by down-pressure springs 46. Depth skids 48 maintain the cutter wheels 12 at the proper cutting depth and are adjustable up or down to set the depth for various seed and soil conditions.

A more detailed discussion of the foregoing structure may be found for example in U.S. Pat. Nos. 4,043,404, 4,043,281 and 4,023,510, as well as in the patents mentioned therein. An alternate skid arrangement is shown in U.S. Pat. No. 4,051,792. However, the structure is utilized merely to orient the cutter wheel of this invention with respect to a tillage apparatus.

Figure 5:
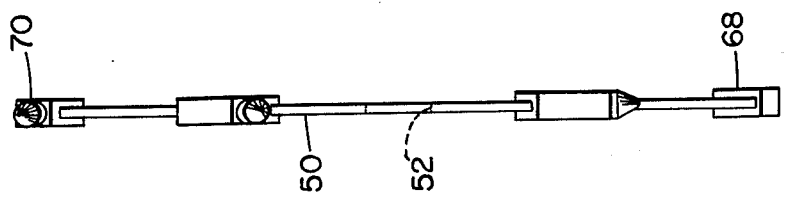
FIG. 5 is an end view of the cutter wheel shown in FIG. 4.
Figure 4:
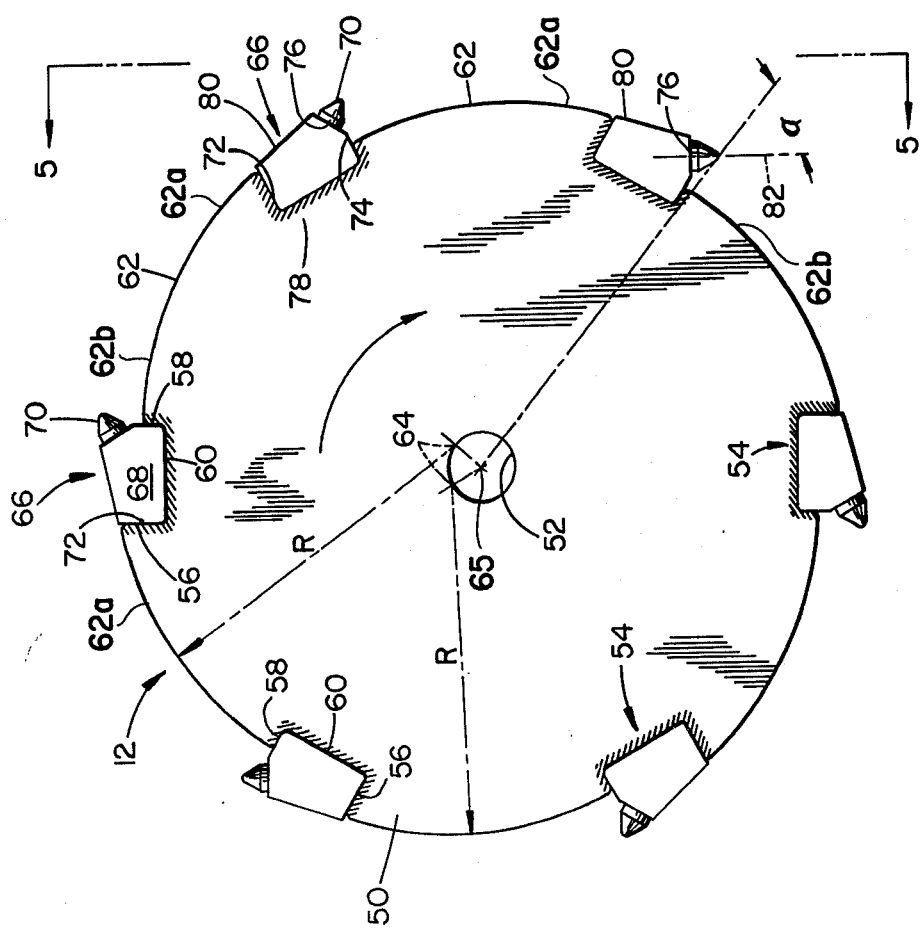
FIG. 4 is a side elevation view of the preferred embodiment of the cutter wheel.

The cutter wheel 12, as best seen in FIGS. 4 and 5, includes a disk-like main body portion 50 with a central shaft receiving aperture 52. The body portion 50 includes a plurality of insert receiving slots 54 equally spaced about the periphery. Each slot is defined by a rear wall 56 facing generally in the direction of rotation, an opposed forward wall 58, and a generally flat bottom section 60. The bottom section 60 is generally perpendicular to a line extending radially from the center of the body through the midpoint of section 60.

Between consecutive slots 54 are arcuate sections 62, each preferably with an identical radius of curvature R but each having a different center of radius of curvature 64 so that, as best seen in FIG. 4, each section increases in distance from, or tapers radially outwardly from, disk center 65 in the direction of rotation (arrow). The forward portion 62a of each tapered section 62 is located radially outwardly of the adjacent rearward portions 62b. The centers 64 are generally equispaced about aperture 52. The peripheral configuration provides the slots 54 with rear walls 56 of greater dimension than forward walls 58. In the preferred embodiment, six slots 54 are provided equally spaced about the periphery.

Each slot 54 receives a cutter-tip assembly 66 made up of an insert 68 and a cutting tip 70. The lower portion of the insert 68 generally conforms to the shape of the slot 54 for receipt thereby. The rear portion 72 of the insert is generally equal in dimension to the rear wall 56. The front portion 74 of the insert is greater in dimension than forward wall 58 and includes a tip-receiving face 76 disposed slightly at an angle rearwardly from the plane of the front portion 74. Cutting tip 70, preferably bullet- or cone-shaped and fashioned from a hard material such as tungsten carbide, is brazed or silver soldered to the face 76. The cutter-tip assembly 66 is positioned in the slot 54 and secured to the main body portion 50, for example, by welding the insert 68 near the bottom and walls of the slot as indicated at 78.

When the assembly 66 is connected to the body portion 50, the top 80 of the insert 68 is generally aligned with the preceding arcuate section 62 and extends that contour in a straight line to the tip-receiving face 76. The point of the tip 70 extends forwardly in the direction of rotation beyond the plane of the front portion 74 and above the counterclockwise-most portion of the next arcuate section 62. As evident from FIG. 4, the shape of the disk 50 allows cutting clearance for the tip 70 while providing substantial back support for the insert 68 along the rear wall 56 of the slot 54. The above disk and insert configuration provides better protection for the tips 70 against obstacles than a conventional deep gullet configuration. Using deep gullets, the tips 70 were found to break off more easily than in the above configuration wherein the outer diameter of the disk 50 tends to hit the obstacle before the tip contacts it.

The angle of face 76 and the general axial orientation of tip 70 indicated by line 82 are chosen so that the brazed or soldered connection between the insert 68 and the tip is loaded primarily in compression to reduce the possibility of breaking the connection. In the preferred embodiment, the angle $\alpha$ between the axis of tip 70 and line extending radially from the center of disk 50 through the point of the tip is considerably greater than 0° but less than 90°. If angle $\alpha$ is too small, the tip 70 will be torqued radially outwardly as it contacts the soil. On the other hand, if $\alpha$ is too large, the apex of the tip 70 will be urged radially inwardly upon soil contact.

As seen in FIG. 5, the width of the base of tip 70 is approximately equal to the width of insert 68. Tip 70 can have various shapes, such as conical, pyramidal, or wedge, and preferably terminates in an apex extending generally in the direction of rotation. A satisfactory furrow can be cut using a tip base width of approximately ⅜ inch. The disk 50 is formed from a thin sheet of metal, typically 0.25 inch, and each cutter-tip assembly 66 is located in its corresponding slot 54 so that its sides extend an equal distance beyond the sides of the disk. Alternatively, the inserts can be offset with respect to the disk and each other to increase the width of the furrow cut by cutter wheel 12 for a given width of tip 70. The inserts 68 can be made wider or narrower than the tip width as long as they provide adequate support for the tip. If the inserts are wider, the relatively soft material quickly wears and tapers to conform to the width of hardened tip 70. In another embodiment, the disk 50 can be formed directly with tip-receiving portions to eliminate the inserts 68. The entire wheel can be cast or fashioned from sheet metal and the tips 70 connected at the proper angle on the tip-receiving portions by a suitable method such as soldering or brazing.

In a working embodiment of the present invention, a 12 inch cutter wheel is provided with each arcuate section 62 having a radius of curvature R equal to about 5¼ inches. The center of each radius R is located on the periphery defining a 1-inch aperture 64. Each insert 68 is about ⅜ inch wide and is welded to a ¼ inch wide disk 50. Six inserts are equally spaced about the periphery of the disk. Each tip-receiving face 76 is angled back at approximately 25° from the front portion 74 of the insert 68. A bullet-shaped tungsten carbide tip 70 is brazed to each face 76 with the angle $\alpha$ being approximately 53°. With the above configuration, the tip connections are loaded primarily in compression as the cutter wheel cuts a furrow. When an obstacle such as a rock is encountered, it is contacted by the unique outer periphery of the disk 50 before the tip 70 reaches it, thus protecting the tip. The incidence of tip breakage is greatly reduced by using the above configuration rather than, for example, providing a deep gullet forwardly of the tip.

In operation, the cutter wheels are lowered to contact the ground and are rotated at a relatively high speed, preferably about 630 rpm. The tips 70 dig into the ground to cut a furrow therein, the maximum depth of which is determined by the setting of the depth skids 48 and is generally between ½ and 2½ inches. The furrow cut has a width approximately equal to or slightly wider than the width of the cutting tip 70. Seed is deposited in the furrow from the seed tube 20 and packed at the bottom of the furrow by packer wheel 24.

The hardened tips 70 provide long lasting cutting teeth. The shape of the disk 50 provides cutting clearance for the tips 70 while protecting them from obstacles and providing backing for the inserts 68 when used. By properly positioning the tips 70 with respect to the rotating disk 50, the joints between the tips and the inserts or disk are loaded primarily in compression during the tilling operation further reducing connection fatigue which would result in the breaking off of the tips.

We claim:

1. In a tillage apparatus, a cutter wheel adapted for rotation in a forward direction for cutting a trench in soil, the cutter wheel comprising:

a disk member having a periphery with a plurality of insert-receiving slots spaced thereabout, each defined by a trailing edge portion facing generally in the direction of rotation, a bottom portion facing generally radially outwardly, and a forward edge portion facing rearwardly opposite the trailing edge portion, and wherein the trailing edge portion extends radially outwardly of the forward edge portion;

a plurality of smoothly contoured sections located between the slots, each section tapering slightly radially inwardly from the trailing edge of one slot to the leading edge of the adjacent slot to define a shallow gullet area adjacent the leading edge;

a plurality of insert members, each including a first portion conforming generally to the shape of one of the slots and secured to the bottom and trailing edge portions of the slot for support by the disk, and a forwardly facing tip-receiving portion located in the gullet area and extending radially beyond the periphery at the forward edge portion; and a tip member connected to the tip-receiving portion and having a hardened cutting surface disposed generally in the direction of rotation so that the tip member is loaded primarily in compression against the insert member as the cutter wheel cuts a trench, each insert member also including a top portion extending forwardly from, and generally tangentially to, the rearwardly adjacent contoured section and forming a substantially continuous peripheral portion with said section and with the radially outermost portion of the tip member so that as the cutter wheel wears radially inwardly, the tip member and the top portion of the insert member wear at approximately the same rate to maintain continuity of the peripheral portion, and wherein a substantial portion of said tip member is located radially inwardly of the top portion of said insert member.

2. The invention defined in claim 1 wherein the tip member has a forwardly terminating portion essentially in the shape of a cone having a central axis, and wherein the angle of intersection of the central axis and a line extending radially from the center of the disk member through the cone-shaped portion is approximately 53 degrees.

3. The invention defined in claim 1 wherein the contoured sections are arcuate and are struck on axes parallel to the axis of rotation of the disk, said axes offset from the center of the disk a distance less than approximately ten percent of the diameter of the disk.

4. The invention defined in claim 3 including six contoured sections of equal length angularly spaced at equal intervals between an equal number of insert members.

5. The invention defined in claim 1 wherein the insert members are welded to the bottom and trailing edge portions of the insert-receiving slots.

6. A rotary cutter wheel for cutting a trench in abrasive material, said wheel comprising: a baseplate having an outer periphery composed in part of a series of angularly spaced edge portions extending substantially radially inwardly from outer ends to inner ends, and in part of arcuate-shaped edge portions formed from radii struck on axes parallel to the axis of rotation of said cutter wheel and extending in a trailing relation from said outer ends into the next adjacent inner ends with the centers of said radii located generally on a circle centered on the axis of rotation of the wheel, said circle having a diameter less than approximately ten percent of the diameter of the wheel; a tooth support supported by the plate on its periphery at each of its radial edge portions and composed of an insert member having a trailing end bearing against the respective radial edge portion and extending therefrom to a leading end, said member disposed in substantial continuous tangential relation to the respective arcuate edge portion that trails from the respective radial edge portion; means attaching the insert member to the baseplate including means fixing the trailing end to the respective radial edge portion; and a tooth insert extending from and in advanced relation to each of the respective leading ends of the respective tooth supports, said tooth insert including a radially outermost portion forming a substantially continuous surface with the tooth support and the respective arcuate edge portion, wherein the tooth insert is hardened relative to the tooth support, said insert and support adapted to wear radially inwardly at approximately the same rate so as to maintain a continuous tangential relation as the wheel wears.

7. The invention as set forth in claim 6 wherein the tooth support member is welded to the baseplate with a weld joining the radial edge portion to the respective trailing end.

8. The invention as set forth in claim 6 or 7 wherein the tooth insert is forwardly pointed and has a central axis, and wherein the angle between the cental axis and a line extending radially from the center of the disk through the point of the tooth insert is approximately 53 degrees.

9. The invention as set forth in claim 8 wherein the leading end of the tooth support member is generally perpendicular to the central axis and is angled rearwardly with respect to the trailing end of the tooth support member.

* * * * *